United States Patent
Kato et al.

(10) Patent No.: US 8,271,134 B2
(45) Date of Patent: Sep. 18, 2012

(54) ROBOT HAVING LEARNING CONTROL FUNCTION

(75) Inventors: Tetsuaki Kato, Minamitsuru-gun (JP); Masakazu Ichinose, Minamitsuru-gun (JP); Kiyonori Inaba, Minamitsuru-gun (JP)

(73) Assignee: Fanuc Corporation, Minamitsuru-gun, Yamanashi (JP)

( * ) Notice: Subject to any disclaimer, the term of this patent is extended or adjusted under 35 U.S.C. 154(b) by 38 days.

(21) Appl. No.: 13/029,550

(22) Filed: Feb. 17, 2011

(65) Prior Publication Data
US 2011/0208356 A1 Aug. 25, 2011

(30) Foreign Application Priority Data
Feb. 19, 2010 (JP) ................. 2010-035160

(51) Int. Cl.
*G05B 19/04* (2006.01)
*G05B 19/18* (2006.01)
(52) U.S. Cl. ........................................... 700/253
(58) Field of Classification Search .......... 700/245–246, 700/250, 253–254, 258, 264; 901/1, 3, 8–9, 901/14, 50
See application file for complete search history.

(56) References Cited

U.S. PATENT DOCUMENTS

| | | | | |
|---|---|---|---|---|
| 6,167,328 A * | 12/2000 | Takaoka et al. | ............... | 700/264 |
| 6,522,949 B1 * | 2/2003 | Ikeda et al. | ............... | 700/245 |
| 7,205,743 B2 | 4/2007 | Iwashita et al. | | |
| 7,996,110 B2 * | 8/2011 | Lipow et al. | ............... | 700/245 |
| 8,170,719 B2 * | 5/2012 | Tsusaka et al. | ............... | 700/257 |
| 8,175,749 B2 * | 5/2012 | Tsusaka et al. | ............... | 700/254 |
| 2005/0107920 A1 | 5/2005 | Ban et al. | | |
| 2005/0113977 A1 | 5/2005 | Nihei et al. | | |

(Continued)

FOREIGN PATENT DOCUMENTS
JP 06-289918 A 10/1994
(Continued)

OTHER PUBLICATIONS
Kiyonori Inaba, et al., "Design of Iterative Learning Controller Based on Frequency Domain Linear Matrix Inequality," 2009 American Control Conference, Hyatt Regency Riverfront, St. Louis, MO, USA, Jun. 10-12, 2009, pp. 246-251.

(Continued)

*Primary Examiner* — Khoi Tran
*Assistant Examiner* — Harry Oh
(74) *Attorney, Agent, or Firm* — Drinker Biddle & Reath LLP

(57) ABSTRACT

A robot having a learning control function is disclosed. The robot includes a robot mechanism unit with a sensor on a part to be positionally controlled and a control unit for controlling the operation of the robot mechanism unit. The control unit includes a normal control unit for controlling the operation of the robot mechanism unit, and a learning control unit for operating the robot mechanism unit according to a task program and carrying out the learning to calculate the learning correction amount in order that position of the part of the robot mechanism unit to be controlled which is detected by the sensor approaches a target trajectory or a target position assigned for the normal control unit. The learning control unit calculates the maximum speed override that can be set with in the learning operation, and carries out the learning to calculate the learning correction amount while increasing the speed override a plurality of times until the maximum speed override is reached.

9 Claims, 7 Drawing Sheets

U.S. PATENT DOCUMENTS

2006/0082340 A1  4/2006  Watanabe et al.
2009/0125146 A1* 5/2009  Zhang et al. .................. 700/253

FOREIGN PATENT DOCUMENTS

| JP | 2001022423 A | 1/2001 |
| JP | 2005-153047 A | 6/2005 |
| JP | 2005149299 A | 6/2005 |
| JP | 2006110702 A | 4/2006 |
| JP | 2006-172149 | 6/2006 |
| JP | 2007144623 A | 6/2007 |

OTHER PUBLICATIONS

Kiyonori Inaba, "Iterative Learning Control for Industrial Robots with End Effector Sensing," Doctoral Dissertation in the Graduate Division of the University of California, Berkeley, Fall 2008.

* cited by examiner

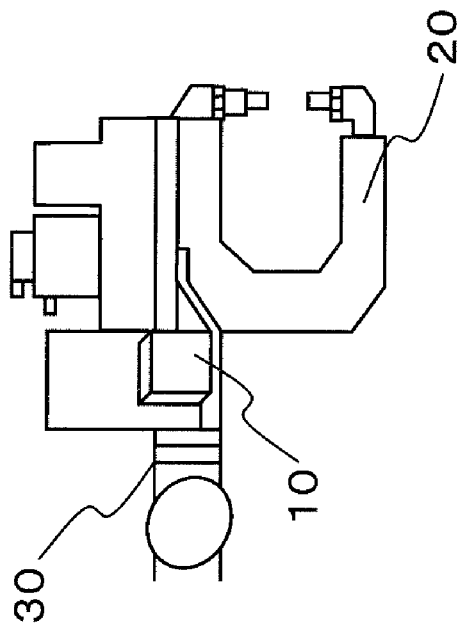
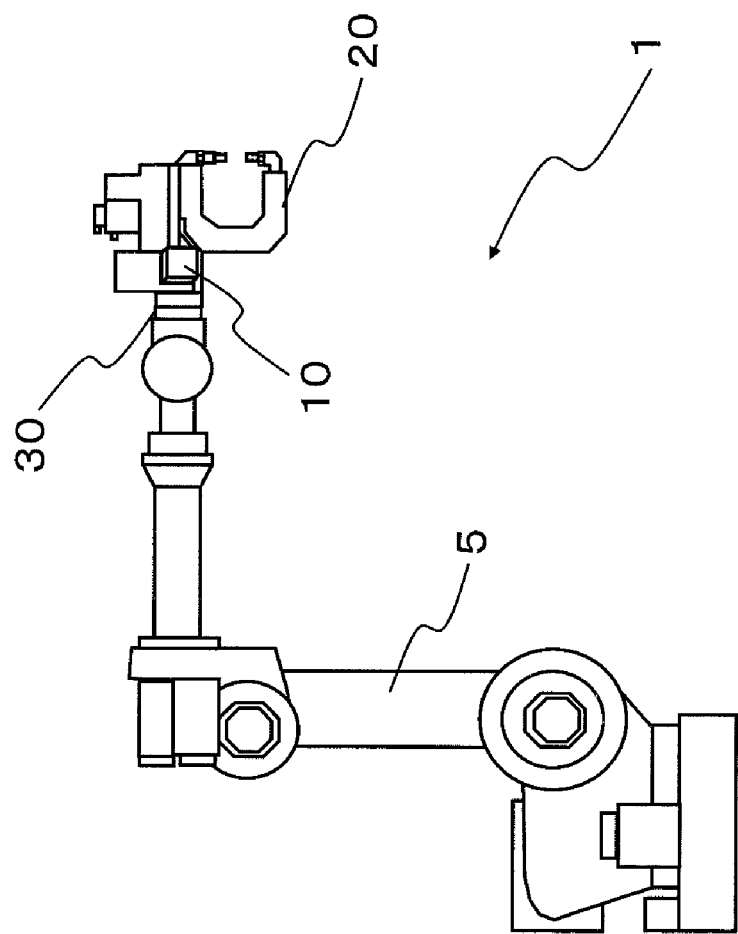

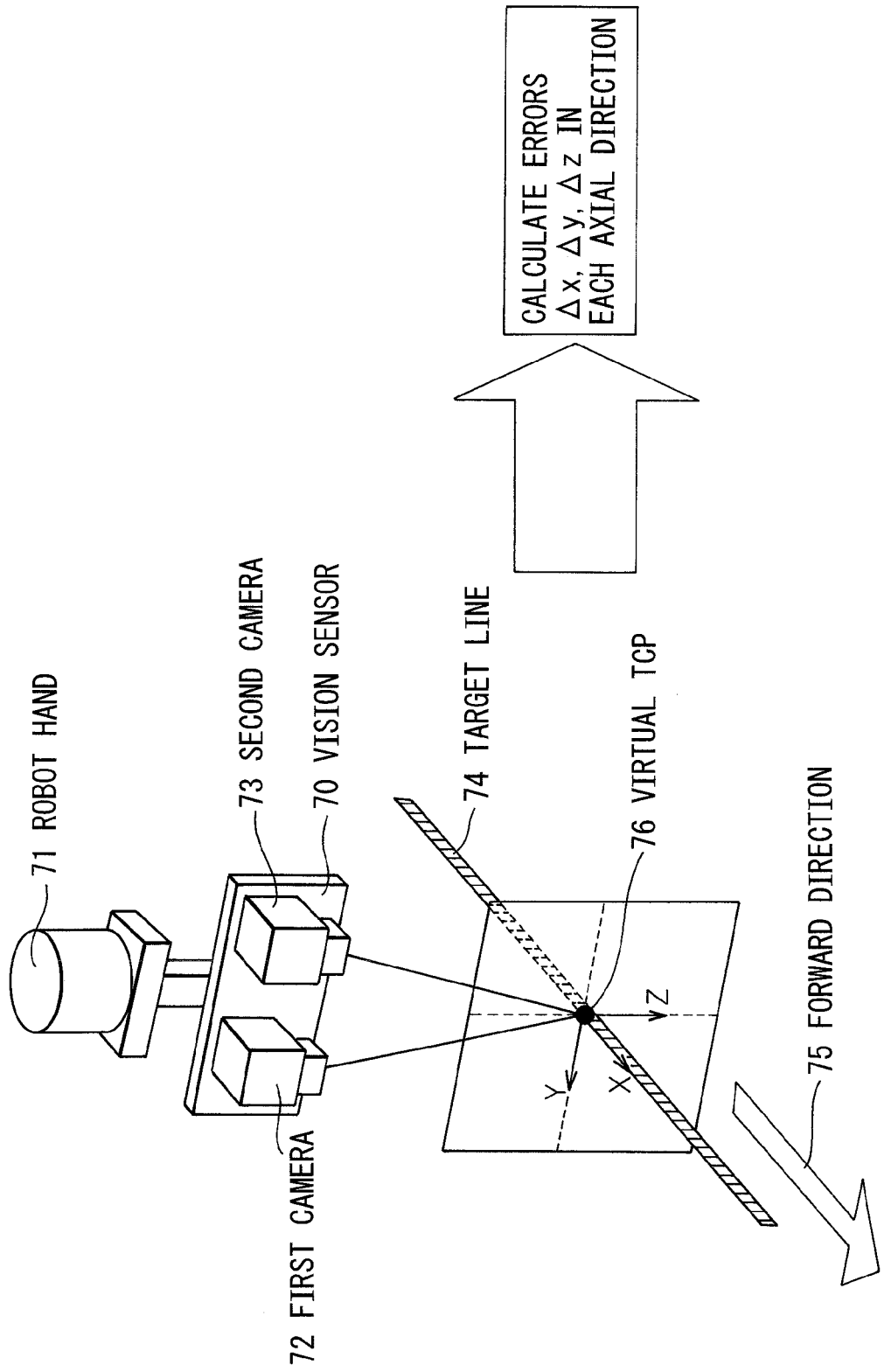

ROBOT HAVING LEARNING CONTROL FUNCTION

This application is a new US patent application that claims benefit of JP 2010-035160, filed Feb. 19, 2010, the content of 2010-035160 being incorporated herein by reference.

FIELD OF THE INVENTION

This invention relates to a robot having a learning control function and in particular, a robot with the operation speed thereof increased using a sensor mounted on an arm of the robot.

BACKGROUND OF THE INVENTION

In a robot, the position and the speed of a member driven by a servo motor are controlled normally by a position feedback control, speed feedback control and current feedback control in such a manner that the position and the speed of the driven member coincide with the commanded position and the commanded speed, respectively.

Even in this feedback control of the position, the speed and current, a trajectory error and a position vibration component occur in a high-speed operation of the robot. Also, in the high-speed operation, the difference in dynamic characteristics between the motor and the arm makes it impossible to measure the trajectory error and the position vibration component of the arm directly from a motor encoder. Therefore, to measure the trajectory error and the position vibration component, it is necessary to mount a sensor directly on the arm. As an example of the learning control with a sensor mounted, a learning control using an acceleration sensor has been disclosed (Patent Document 1).

FIG. 1 is a schematic diagram showing a robot having the conventional learning controller for carrying out the learning control. A robot 100 is configured of a robot mechanism unit 1 and a control unit 2 for controlling the robot mechanism unit 1. The control unit 2 includes a learning control unit 3 for carrying out the learning control of the robot and a normal control unit 4 for directly driving the robot mechanism unit 1.

The robot mechanism unit 1 includes an acceleration sensor 10, an arm 11, an arm forward end portion 12 and a motor (not shown). The motor of the robot mechanism unit 1 is supplied with a signal from the normal control unit 4 of the control unit 2 and drives the arm 11. Further, the motor of the robot mechanism unit 1 moves the arm forward end portion 12 to the desired position and carries out a task such as welding. At the arm forward end portion 12, the acceleration sensor 10 is installed and can acquire the spatial position data $(y_j(k))$ of the arm forward end portion 12. The position data $(y_j(k))$ from the acceleration sensor 10 is output to the learning control unit 3 and used for the learning control. In the foregoing description, reference character j designates the number of times trials are made, k the time, and Ns the number of the times the sampling is made in each trial. Character $y_d(k)$ designates a position command, $(y_j(k))$ the amount controlled in the preceding control session, and $e_j(k)$ the target correction amount calculated from $y_d(k)$ and $(y_j(k))$ through a filter. Also, $u_j(k)$ designates the learning correction amount of the preceding control session.

The normal control 4 includes a position control unit 41, a speed control unit 42, a current control unit 43, an amplifier 44 and a differentiation means 45. The position control unit 41 receives the position command data $(y_d(k))$ input from outside the control unit 2 and the position information of, for example, the motor of the robot mechanism 1, while at the same time outputting the desired position information of the arm forward end portion 12 of the robot mechanism unit 1 to the speed control unit 42. The differentiation means 45 receives the motor position information fed back from the robot mechanism 1, and by calculating the motor speed, outputs the motor speed to the speed control unit 42.

The speed control unit 42 calculates the desired motor speed taking the position information from the position control unit 41 and the motor speed information from the differentiation means 45 into consideration, and outputs the desired motor speed to the current control unit 43. The current control unit 43 receives the current value fed back from the amplifier 44 and, by calculating the current flowing in the motor in such a manner as to achieve the desired motor speed input from the speed control unit 42, outputs the resultant current to the amplifier 44. The amplifier 44 calculates the desired power based on the current value from the current control unit 43, and charges the desired power in the motor (not shown) of the robot mechanism unit 1.

The learning control unit 3 includes a one-trial delay unit $W^{-1}$ 300, a first memory 31, a learning controller L(q) 32, a low-pass filter Q(q) 33, a second memory 34 and a third memory 35. The first memory 31 is supplied with and stores, through a filter, a target correction amount $e_j(k)$ based on the position command data $(y_d(k))$ for the arm forward end portion 12 and the position data $(y_j(k))$ measured by the acceleration sensor 10, while at the same time outputting the target correction amount $e_j(k)$ to the learning controller L(q) 32. The target correction amount $e_j(k)$ corresponds to the trajectory and vibration errors with respect to the desired position of the arm forward end portion 12.

The learning controller L(q) 32, by executing the task program stored therein, calculates the learning correction amount $u_{j+1}(k)$ from the target correction amount $e_j(k)$ and the preceding learning correction amount $u_j(k)$, and outputs the learning correction amount $u_{j+1}(k)$ to the low-pass filter Q(q) 33. The learning correction amount $u_{j+1}(k)$ input to the low-pass filter Q(q) 33 is output to and stored in the second memory 34 while at the same time being added to the position error data calculated by the position control unit 41 of the normal control unit 4.

Based on the position error data thus corrected, the robot mechanism unit 1 is controlled and the learning control is repeated. In the learning control, this series of processes is repeatedly executed to converge the position error to "0". After completion of the learning control, the loop for updating the learning correction amount indicated by the dotted line in FIG. 1 is not executed, and the learning correction amount $u_{j+1}(k)$ is output from the second memory 34 to the position control unit 41. Incidentally, in FIG. 1, the solid line defines the portion which is executed by the normal control unit 4 to operate the robot mechanism unit 1 after completion of the learning control in the learning operation indicated by the dotted line.

Patent Document 1: JP-A-2006-172149

In the conventional learning control, the improvement in the trajectory and vibration errors under a certain condition is considered. However, the problem is that the application range is narrow, and operating convenience is not taken into consideration.

The aforementioned conventional technique described above as an example of the learning control using a sensor, which represents an application to a machine tool, assumes the use of an acceleration sensor. In the case where the acceleration sensor is mounted on the robot, on the other hand, the problem is posed that the trajectory error and the position error, though capable of being extracted in orthogonal coordinates, cannot be calculated on each axis directly from the sensor data.

Also, according to the conventional technique described above, the normal high-pass filter is used to extract the trajectory and vibration errors from the acceleration sensor. In the machine tool, the frequency band for feedback control is as high as several tens of Hz to several hundred Hz, or in other words, the feedback control has a very high performance in this frequency band, and therefore, no serious problem is posed even in the case where the data of not more than 10 Hz cannot be learned to remove the offset data. Thus, the offset is not a great problem. In the industrial robot, on the other hand, the frequency band for feedback control is normally several Hz. In a higher frequency band, the feedforward control is conducted, and the performance is liable to depend on the intermodel error. Therefore, the particular part is corrected by learning control. In the case where a high-pass filter of 1 Hz is used to remove the offset of the data from the acceleration sensor, for example, the phase of the trajectory and the vibration errors of up to about 10 Hz rotates, and therefore, trajectory and vibration error data in the frequency band to be removed are also processed undesirably, thereby posing the problem that learning control performance is deteriorated.

Another problem is difficulty in adjusting the learning controller. Although various adjustment methods have been proposed, the problems that the number of controllers is high, stability is reduced and the vast amount of matrix calculation is required remain unsolved. Under the circumstances, the adjustment is made by trial and error in most work fields. Also, the fact that the robot system changes in accordance with the posture of the robot increases the difficulty of adjustment by trial and error. At present, an industrial robot having the learning function to increase the speed by adjusting the parameters automatically is still unavailable.

SUMMARY OF THE INVENTION

According to one aspect of the invention, there is provided a robot comprising a robot mechanism unit having a sensor on a part with the position thereof to be controlled and a control unit for controlling the operation of the robot mechanism unit, wherein the control unit includes a normal control unit for controlling the operation of the robot mechanism unit and a learning control unit for causing the robot mechanism unit to operate according to a task program and conducting the learning operation to calculate the learning correction amount in order that the position of the part of the robot mechanism unit to be controlled and detected by the sensor is made to approach a target trajectory or position assigned to the normal control unit, and wherein the learning control unit conducts the learning operation in such a manner that by calculating the maximum speed override that can be set in the learning operation and increasing the speed override a plurality of times until reaching the maximum speed override, the learning correction amount is calculated.

According to another aspect of the invention, the learning control unit may calculate the maximum speed override based on the maximum speed and the maximum acceleration allowed for the robot mechanism unit.

According to still another aspect of the invention, the learning control unit may include a high-pass filter for calculating the trajectory and vibration errors of the robot mechanism unit based on the data detected by the sensor.

According to yet another aspect of the invention, the learning control unit desirably calculates the position on each axis containing the trajectory position and vibration errors by inverse kinematics of the data detected by the sensor to those on the three basic axes.

According to a further aspect of the invention, the learning control unit may calculate the position and inclination of the sensor by causing the robot mechanism unit to perform a predetermined operation.

According to a still further aspect of the invention, the learning control unit desirably further includes a memory for holding the learning correction amount.

According to a yet further aspect of the invention, the sensor may be one of a vision sensor, an acceleration sensor, a gyro sensor, an inertia sensor and a distortion sensor.

According to yet another aspect of the invention, the sensor may desirably further include a mounting means or more desirably a magnet replaceably mounted on the robot mechanism unit as the mounting means.

According to this invention, the learning control unit conducts the learning operation by calculating the maximum speed override that can be set in the learning operation, and while increasing the speed override a plurality of times before reaching the maximum speed override, calculates the learning correction amount, thereby making it possible to increase the speed automatically in the learning operation.

BRIEF DESCRIPTION OF THE DRAWINGS

These and other features and advantages of the present invention will be better understood by reading the following detailed description taken together with the drawings wherein:

FIG. 2 is a diagram showing the configuration of the robot mechanism unit and the sensor of the robot according to a first embodiment of the invention;

FIG. 7 is a diagram showing an example of the vision sensor.

DETAILED DESCRIPTION OF THE PREFERRED EMBODIMENTS

Figure 1:
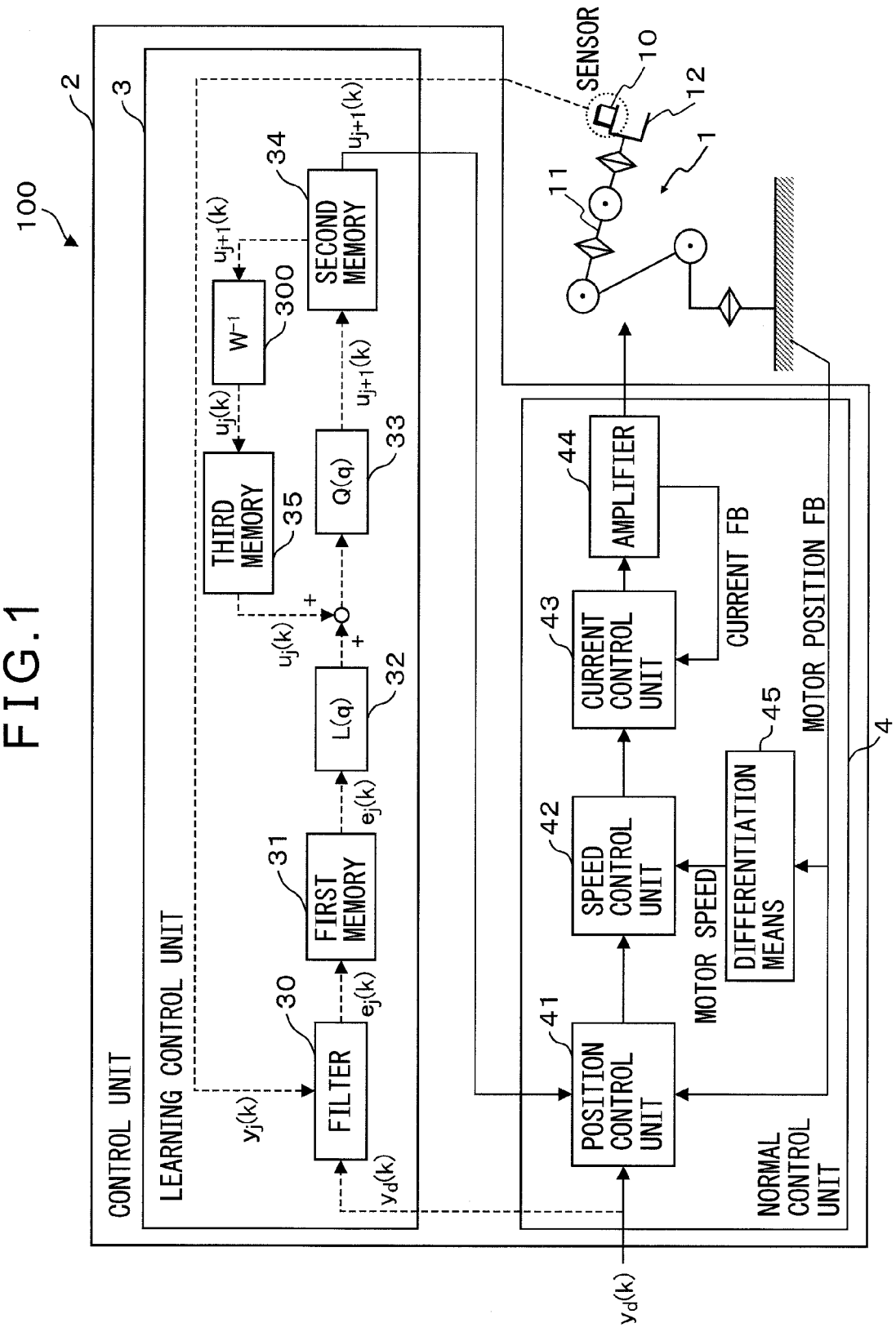
FIG. 1 is a diagram showing the configuration of the conventional robot.

The robot according to the invention is explained below with reference to the drawings. However, it should be noted that the technical scope of this invention is not limited to the embodiments described below and covers the invention described in the appended claims and equivalents thereof.

According to this invention, the speed of the spot operation is increased. First, the configuration of the robot mechanism unit of the robot according to the invention is shown in FIG. 2. FIG. 2A shows a general configuration of the robot mechanism unit, and FIG. 2B an enlarged view of a gun having a sensor mounted thereon. The robot mechanism unit 1 is a well-known robot manipulator (hereinafter referred to simply as "the robot mechanism unit"), and may have any configuration as long as it can assume the position and posture in which the gun 20 can carry out the task. As a sensor for detecting the position of the robot mechanism unit 1 and the trajectory and/or vibration error which may occur at the time of deceleration of the robot mechanism unit 1 to stop the operation thereof, an acceleration sensor 10 is mounted at the forward end portion of the gun 20 constituting a part at which the position of the robot mechanism unit is controlled. A tri-axial speed sensor may be used as the acceleration sensor 10. The acceleration sensor 10 has a magnet and is replaceable. The case of the acceleration sensor 10 may be formed as the magnet.

Although the acceleration sensor is used in the embodiment of the invention described above, a vision sensor may be used in place of the acceleration sensor. An example in which the vision sensor is used is shown in FIG. 7. The vision sensor 70 has two cameras, i.e. a first camera 72 and a second camera 73, and is installed on a robot hand 71. The vision sensor 70 measures the position of a virtual TCP 76 on a target line 74 using the cameras 72, 73, and calculates the trajectory and vibration errors $\Delta x$, $\Delta y$, $\Delta z$ along each of the X, Y, Z axes where the forward direction 75 is the positive direction along X axis.

After mounting the acceleration sensor 10, the robot mechanism unit is operated as predetermined for calibration to calculate the position and inclination of the sensor 10. The calibration is made according to the steps described below.

Figure 3:
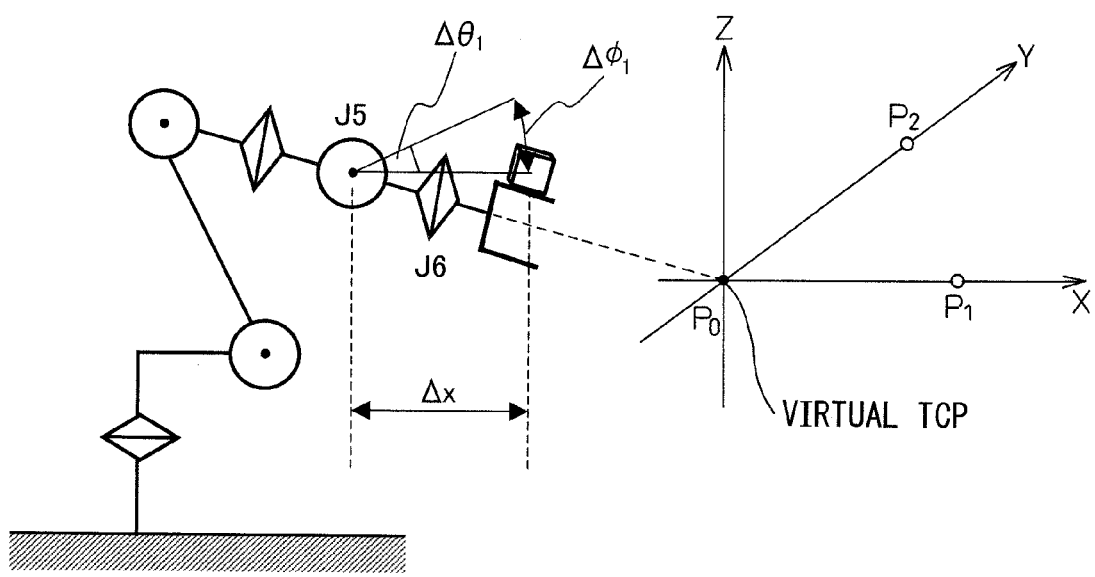
FIG. 3 is a schematic diagram showing the configuration of the robot mechanism unit of the robot according to the first embodiment of the invention.

First, the inclination of the acceleration sensor is specified. As shown in FIG. 3, the operation is performed along X axis from a given point $P_0$ on the world coordinate system, and by passing through a given point $P_1$, the corresponding acceleration data is acquired. The acceleration data in stationary state at point $P_0$ is designated as $a_0$, and the acceleration data in operation at point $P_1$ as $a_1$. Then, the acceleration $a_{x\gamma}$ exceeding the gravitational acceleration (stationary acceleration) can be expressed as $a_{x\gamma}=a_1-a_0$. The standardization is defined as follows.

$$a_x = \frac{a_{xr}}{|a_{x\gamma}|}$$

Similarly, the operation is performed along Y axis from a given point $P_0$, and by passing through a given point $P_2$, the corresponding acceleration data $a_2$ is acquired. In the process, the acceleration $a_{y\gamma}$ exceeding the gravitational acceleration (stationary acceleration) can be expressed as $a_{y\gamma}=a_2-a_0$. The standardization is defined as follows.

$$a_y = \frac{a_{yr}}{|a_{y\gamma}|}$$

The vector orthogonal to these two data is given as $a_{z\gamma}=a_x \times a_y$ and can be expressed as follows.

$$a_z = \frac{a_{z\gamma}}{|a_{z\gamma}|}$$

As a result, the matrix $R_t$ for transforming the posture to the world coordinate system from the tool coordinate system is expressed as follows.

$$R_t = [a_x, a_y, a_z]$$

Then, parts J5 and J6 are operated to specify the position of the acceleration sensor. First, as shown in FIG. 3, the part J5 is rotated by $\Delta\theta_1$. The corresponding acceleration data measured in the acceleration sensor coordinate system is multiplied by the matrix $R_t$. Assuming that the acceleration data transformed to the world coordinate system is given as $$(\ddot{\phi}_{1x}, \ddot{\phi}_{1y}, \ddot{\phi}_{1z})$$

Then, the sensor displacement $\Delta\phi_1$ is expressed as $$\Delta\phi_1 = \iint \sqrt{\ddot{\phi}^2_{1x} + \ddot{\phi}^2_{1z}}\, dt dt$$

In this case, the offset amount $\Delta x$ in X direction of the world coordinate system is expressed as $\Delta x = \Delta\phi_1/\Delta\theta_1$.

Figure 4:
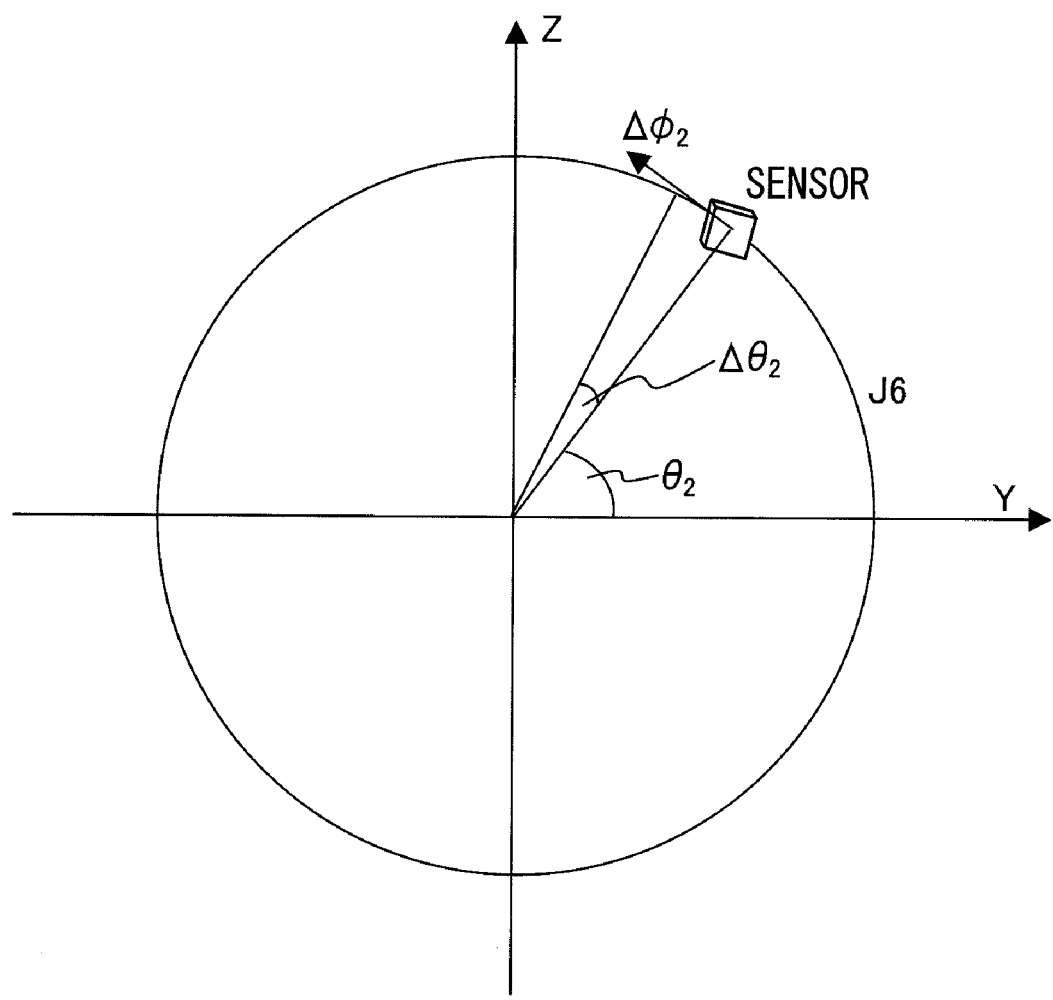
FIG. 4 is a diagram showing the position of the sensor in the world coordinate system.

As shown in FIG. 4, the part J6 is rotated by $\Delta\theta_2$. Then, the corresponding acceleration data measured in the acceleration sensor coordinate system is multiplied by the matrix $R_t$, and the acceleration data transformed in the world coordinate system is given as $$(\ddot{\phi}_{2x}, \ddot{\phi}_{2y}, \ddot{\phi}_{2z})$$

Then, the sensor displacement $\Delta\phi_2$ is expressed as follows.

$$\Delta\phi_2 = \iint \sqrt{\ddot{\phi}^2_{2y} + \ddot{\phi}^2_{2z}}\, dt dt$$

The relation holds that $\gamma = \Delta\phi_2/\theta_2$, and the offset amount $\Delta y$ in Y direction of the world coordinate system is calculated as $\Delta y = \gamma \cos\theta_2$, and the offset amount $\Delta z$ in Z direction of the world coordinate system as $\Delta z = \gamma \sin\theta_2$.

Next, the learning controller is designed. Initially, the frequency response from the input of the learning correction amount for each axis to the position estimated based on the acceleration sensor is measured. Also, the block of the learning control is plotted as shown in FIG. 5.

Figure 5:
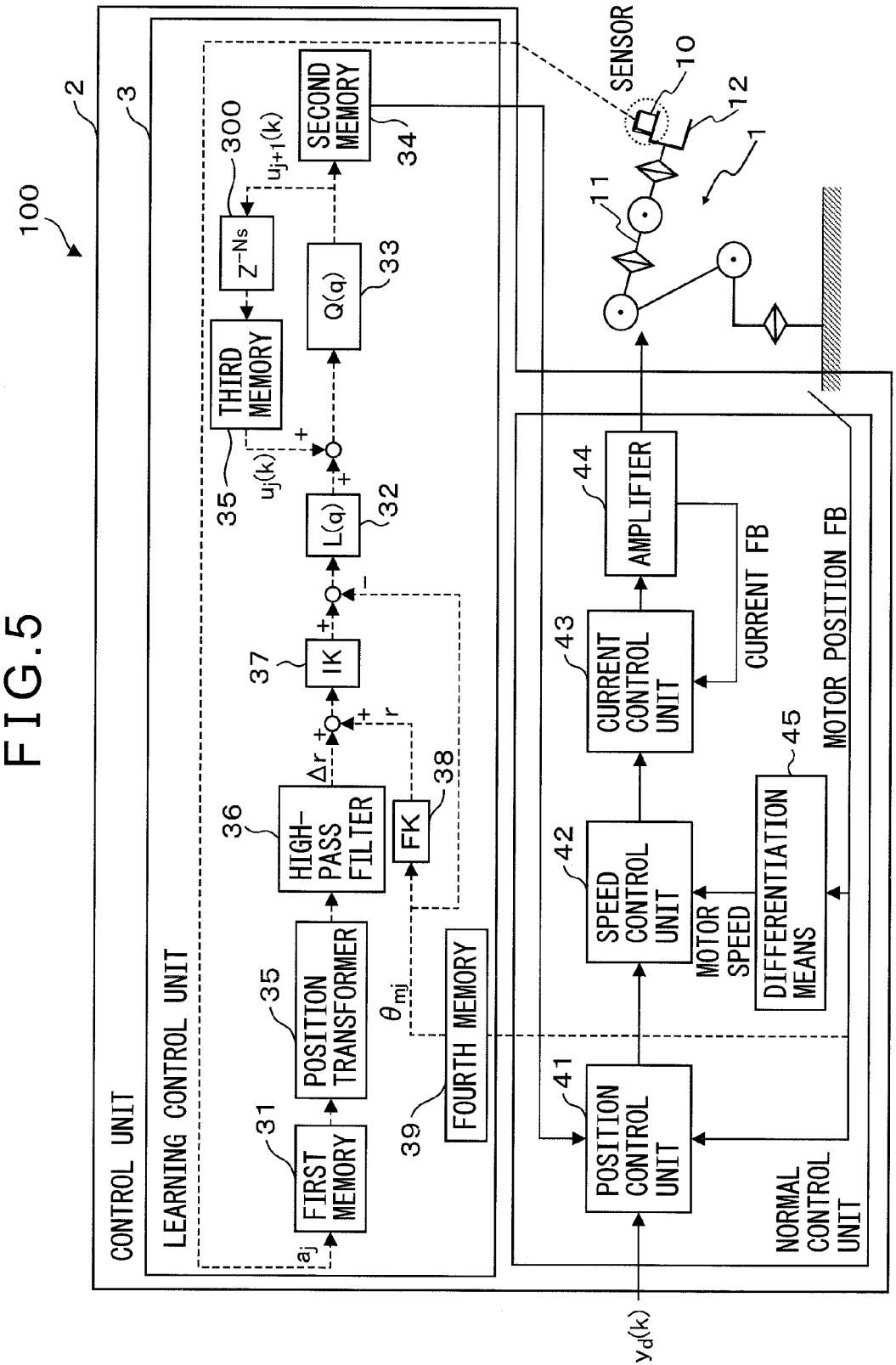
FIG. 5 is a diagram showing the configuration of the robot according to the first embodiment of the invention.

A schematic diagram of the robot according to an embodiment of the invention is shown in FIG. 5. The robot 100 is configured of a robot mechanism unit 1 and a control unit 2 for controlling the robot mechanism unit 1. The control unit 2 includes a learning control unit 3 for carrying out the learning control of the robot and a normal control unit 4 for driving the robot mechanism unit 1 directly.

The learning control unit 3 operates the robot mechanism unit 1 according to a task program, and carries out the learning to calculate the learning correction amount in order that the position of the part of the robot mechanism unit 1 to be controlled and detected by the acceleration sensor 10 is rendered to approach the target position $Y_d(k)$ assigned to the normal control unit 4. The configuration of other parts than the learning control unit 3 is similar to that of the conventional robot shown in FIG. 1, and therefore, not explained in detail. The learning control unit 3 includes a first memory 31, a position transformer 35, a high-pass filter 36, an inverse transformer IK 37, a forward transformer FK 38, a learning controller $L(q)$ 32, a low-pass filter $Q(q)$ 33, a second memory 34, a third memory 35 and a fourth memory 39. The learning controller is designed by solving a linear matrix inequality from the frequency response result.

The linear matrix inequality is the problem of calculating the value x minimizing $c^T x (c \in R^m)$ under the following restraint.

$$F(x) = F_0 + \sum_{i=1}^{m} x_i F_i \geq 0 \tag{1}$$

$$(x \in R^m, F_i = F_i^* \in R^{n \times n}, m, i \in Z)$$

where $F_i$ is a positive semidefinite matrix.

Now, assume that the learning controller is expressed as $$L(z) = L_0 z^{-N_0} + L_1 z^{-N_0+1} + \ldots + L_{N_0} z^0 + \ldots + L_{2N_0-1} z^{N_0-1} + L_{2N_0} z^{N_0}$$

where $N_0 \in Z$, and that the relation holds that $$x = [\gamma^2 \, L_0 \, L_1 \ldots L_{2N_0}]^T \, c^T = [1 \, 0 \, 0 \ldots 0]$$

where $$\gamma \in R, L_k \in R^{N_y \times N_u}, k \in Z$$

Then, the condition for guaranteeing the stability and the monotonic decrease of the learning controller is expressed as shown below on the frequency region.

$$\|Q(z)(I - L(z)P(z))\|_\infty = \gamma < 1$$

In this equation, Q(z) designates a low-pass filter with the learning band in the cut frequency, L(z) the learning control filter and P(z) the transfer function from the input of the learning correction amount to the object to be controlled. The smaller the value γ, the higher the performance of the learning controller. The optimization program of the learning controller is how to calculate the learning filter L(z) associated with the minimum value γ in a given learning control frequency band. This equation can be rewritten as follows.

$$\begin{bmatrix} 0 & Q(e^{j\Omega_i})^* \\ Q(e^{j\Omega_i}) & 0 \end{bmatrix} + \gamma^2 \begin{bmatrix} I & 0 \\ 0 & 0 \end{bmatrix} +$$

$$\begin{bmatrix} 0 & (-Q(e^{j\Omega_i})L(e^{j\Omega_i})P(e^{j\Omega_i}))^* \\ (-Q(e^{j\Omega_i})L(e^{j\Omega_i})P(e^{j\Omega_i})) & 0 \end{bmatrix} \geq 0$$

($\gamma < 1$ for all $\Omega_i$)

where assuming that the relation $\phi_k(z) = z^{-N_0 + (k-1)}$ holds, the equation expressed as $$L(e^{j\Omega_i}) = L_0 \phi_0(z)|_{z=e^{j\Omega_i}} + \ldots + L_{2N_0} \phi_{2N_0}(z)|_{e^{j\Omega_i}}$$

$$= \sum_{k=0}^{2N_0} L_k \phi_k(z) \Big|_{e^{j\Omega_i}}$$

is obtained.

In this equation, $K_k$ can be expressed by the linearity of $\alpha_{k,j}$ and $V_j$, where $V_j$ is in the same dimension as $L_k$, and always zero for other than the element (j,i). For example, $N_y = 2$, $N_u = 2$.

$$L_k = \begin{bmatrix} L_{1,1}^k & L_{1,2}^k \\ L_{2,1}^k & L_{2,2}^k \end{bmatrix} = L_{1,1}^k \begin{bmatrix} 1 & 0 \\ 0 & 0 \end{bmatrix} + L_{1,2}^k \begin{bmatrix} 0 & 1 \\ 0 & 0 \end{bmatrix} + L_{2,1}^k \begin{bmatrix} 0 & 0 \\ 1 & 0 \end{bmatrix} + L_{2,2}^k \begin{bmatrix} 0 & 0 \\ 0 & 1 \end{bmatrix} =$$

$$\alpha_{k,1} V_1 + \alpha_{k,2} V_2 + \alpha_{k,3} V_3 + \alpha_{k,4} V_4$$

Also, $$Q(e^{j\Omega_i})L(e^{j\Omega_i})P(e^{j\Omega_i}) = Q(e^{j\Omega_i}) \sum_{k=0}^{2N_0} \sum_{j=1}^{N_y N_u} \alpha_{k,j} V_j \phi_k(z) \Big|_{z=e^{j\Omega_i}} P(e^{j\Omega_i})$$

$$= \sum_{l=1}^{(2N_0+1)N_y N_u} \beta_l F_l^i$$

where $$\beta_l = \alpha_{k,j}$$

$$F_l^i = Q(e^{j\Omega_i}) V_j P(e^{j\Omega_i})$$

As a result, this equation is rewritten as $$\gamma^2 \begin{bmatrix} I & 0 \\ 0 & 0 \end{bmatrix} + \sum_{l=1}^{(2N_0+1)N_y N_u} \beta_l \begin{bmatrix} 0 & F_l^i(e^{j\Omega_i})^* \\ F_l^i(e^{j\Omega_i}) & 0 \end{bmatrix} +$$

$$\begin{bmatrix} 0 & Q(e^{j\Omega_i})^* \\ Q(e^{j\Omega_i}) & 0 \end{bmatrix} \geq 0$$

Considering the first and second terms of this equation as $\Sigma_{i=1}^m x_i F_i$ and the third term as $F_0$, and the equation defined as $$c = [1 \, 0 \, 0 \ldots 0], x = [\gamma^2 \, \beta_1 \, \beta_2 \ldots \beta_{(2N_0+1)N_y N_u}]$$

Then, the equation is expressed as $\Sigma_{i=1}^m x_i F_i + F_0$.

This is equivalent to the restraint of the linear matrix inequality (1), and the minimization problem leads to the problem of how to minimize $C^T x$, i.e. $\gamma^2$. This can be interpreted also as the optimization problem of the learning controller. Thus, the sufficient condition for stability and monotonic decrease is given as $$\Sigma_{i=1}^m x_i F_i + F_0$$

By measuring $P(e^{j\Omega^i})$ experimentally and determining the learning band filter Q(z), the learning filter L(z) can be determined automatically.

Further, considering the robustness of the learning controller, the feature of the robot is that the system thereof is varied greatly with the posture.

Assuming that in the case where a given posture is determined as a reference posture, $P_n(z)$ is the learning system for the reference posture. Then, an arbitrary posture $P_m(z)$ is expressed as $P_m(z) = P_n(z) + \Delta P_m(z)$, where $\Delta P_m(z)$ is a change amount of the learning system from the reference posture. In this case, the restraint with the learning band filter Q(z) available is expressed as $$\gamma_m^2 \begin{bmatrix} I & 0 \\ 0 & 0 \end{bmatrix} + \sum_{l=1}^{(2N_0+1)N_y N_u} \beta_l \begin{bmatrix} 0 & F_{l,m}^i(e^{j\Omega_i})^* \\ F_{l,m}^i(e^{j\Omega_i}) & 0 \end{bmatrix} +$$

$$\begin{bmatrix} 0 & Q(e^{j\Omega_i})^* \\ Q(e^{j\Omega_i}) & 0 \end{bmatrix} \geq 0$$

Considering that the relation $x_m = [\gamma_m^2 \, \beta_{1,m} \, \beta_{2,m} \ldots \beta_{(2N_0+1)N_y N_u, m}]$ holds, the sufficient condition for stability and monotonic decrease is met by satisfying the following condition for an arbitrary integer m.

$$c^T x_m \leq 1$$

By measuring $P(e^{j\Omega^i})$ experimentally for the number m of postures, the learning controller can be automatically determined as in the preceding case.

Next, the data processing steps for the learning controller are explained. As shown in FIG. 5, the feedback is established from the three loops of position control, speed control and current control, and the learning control is formed as a loop outside the position control loop of the feedback operation.

The part designated by solid line forms an effective loop during the learning operation, and after stop, the loop indicated by dotted line becomes effective. Character $a_j$ designates the data obtained from the acceleration sensor, and the position transformer 35 transforms the acceleration data $a_j$ into the position data. During the learning, the data on the vibration occurring during the stationary state of the robot detected by the acceleration sensor 10 is held in the first memory 31. The learning correction amount $u_{j+1}(k)$ is output from the second memory 34.

After completion of the operation, the position transformer 35 estimates the trajectory/vibration error of the orthogonal coordinate, and by use of the high-pass filter 36 providing a zero-phase high-pass filter, the trajectory/vibration error $\Delta r$ for other than the offset is extracted. This trajectory/vibration error is added to the position data r of the sensor estimated using FK from the motor position feedback (FB) data thereby to estimate the sensor position in the orthogonal coordinate system of the acceleration sensor 10 including the dynamics of the arm.

By inverse transformation of the sensor position estimated from the sensor into the three basic axes, the position on each axis including the arm dynamics is calculated. From this position on each axis including the arm dynamics, the position on each axis not including the arm dynamics, i.e. the motor position is subtracted thereby to calculate the target correction amount on each axis. In the equation shown below, $\Psi_j$ designates the target correction amount on each axis for the j-th trial, IK the inverse transformation, and $\theta_{mj}$ the motor position on each axis for the j-th trial.

$$\psi_j = IK^{-1}(r + \Delta r) - \theta_{mj}$$

By inputting this target correction amount for each axis to the learning controller, the correction amount $u_{j+1}(k)$ for the next trial is calculated. Through the learning controller $L(q)$ 32, the learning correction amount $u_j$ for the preceding trial is added from the third memory 35, and the correction amount $u_{j+1}$ for the next trial is calculated through the low-pass filter $Q(q)$ 33.

Figure 6:
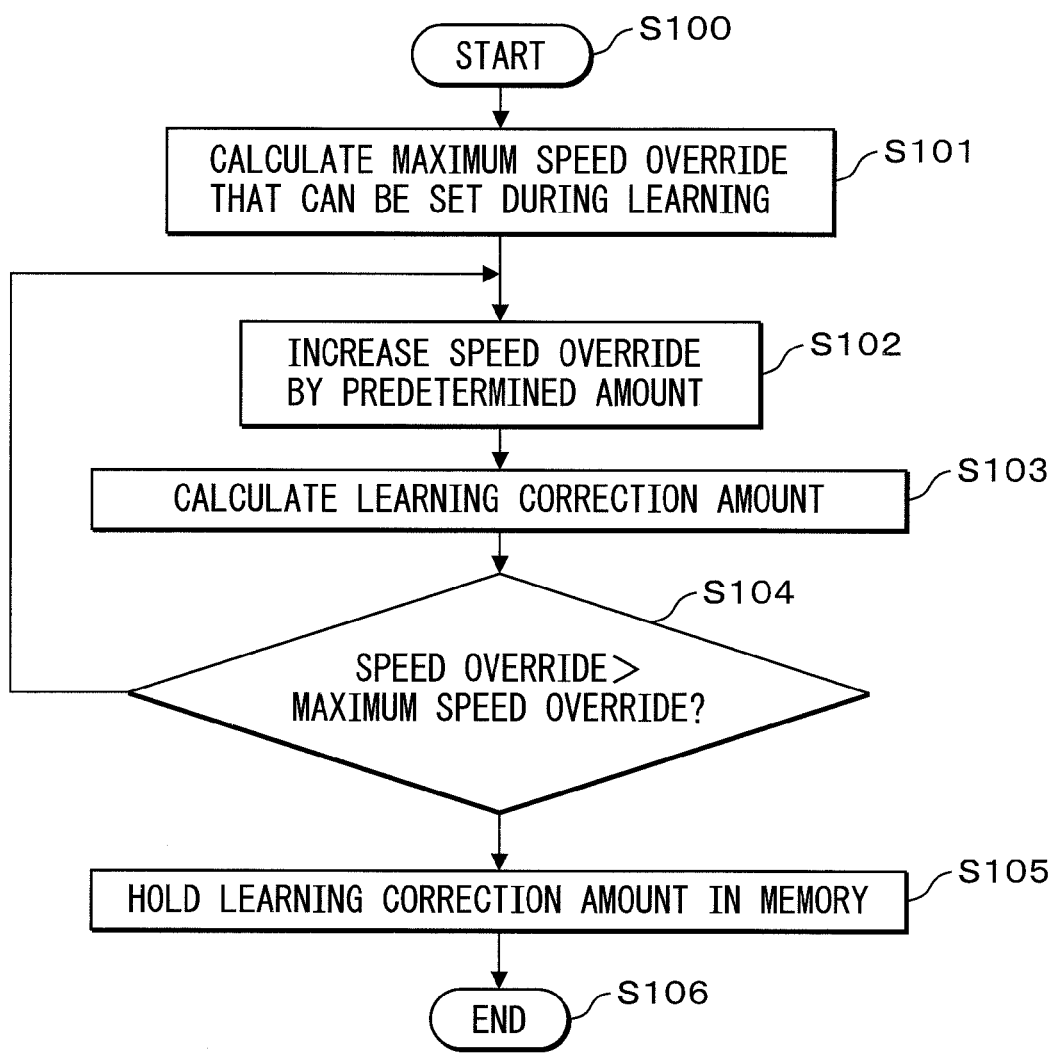
FIG. 6 is a flowchart for explaining the steps of increasing the speed of operation of the robot mechanism unit forming the robot according to the invention.

Next, the steps of increasing the operation speed of the robot mechanism unit in the learning control operation according to the invention are explained with reference to FIG. 6. FIG. 6 is a flowchart explaining the steps of increasing the operation speed of the robot mechanism unit. To increase the operation speed of the robot mechanism unit, the learning control unit calculates the maximum speed override that can be set during the learning, namely in learning operation, and while increasing the speed override a plurality of times before reaching the maximum speed override, the learning is made to calculate the learning correction amount. "Learning operation" means operating the robot mechanism unit according to a task program and carrying out the learning to calculate the learning correction amount in order that position of a part of the robot mechanism unit to be controlled which is detected by the sensor approaches a target trajectory or a target position assigned for the normal control unit.

First, in step S101, the maximum speed override that can be set during the learning is calculated by the learning control unit. The maximum speed override is calculated based on the maximum speed and the maximum acceleration allowed for the robot mechanism unit. In the first place, the robot mechanism unit is operated once, and the maximum speed override that can be learned for each axial motor in terms of the maximum acceleration and the maximum speed is calculated from the data on the first trial.

As in the first step, the maximum speed override that can be learned for each axial motor is calculated from the viewpoint of the maximum acceleration. The equation of motion of the robot is defined as follows.

$$\tau = M(\Theta)\ddot{\Theta} + V(\Theta, \dot{\Theta}) + G(\Theta)$$

where $\Theta$ is the position and speed of the arm.

In this equation, $M(\Theta)$ is the matrix of the inertia term, $V(\Theta, \dot{\Theta})$ the vector of the speed term, and $G(\Theta)$ the vector of the gravity term. A great amount of torque is used mainly for acceleration or deceleration. Assuming that the torque increase due to the increase in speed override is mainly caused from $M(\Theta)\ddot{\Theta}$, the approximate value of the maximum speed override ovr_max$_{1,i}$ is calculated from the viewpoint of acceleration and deceleration.

Assuming that the maximum torque for the first trial is $\tau_{max,i}$, the maximum torque tolerance of the motor $\tau_{p,i}$ and the torque $M(\Theta)\ddot{\Theta}$ used for acceleration and deceleration is $\tau_{a,i}$. Then, the equation below is obtained.

$$\tau_{a,i} = \tau_{max,i} - (V(\Theta, \dot{\Theta}) + G(\Theta))_i$$

In the process, considering that over_max$_{1,i}$ is proportional to the square of $\tau_{a,1}$, the relation holds that $$\text{ovr\_max}_{1,i} = \sqrt{\frac{\tau_{p,i} - (V(\Theta, \dot{\Theta}) + G(\Theta))_i}{\tau_{a,i}}}$$

where the affix i indicates the i-th axis.

In the manner described above, the maximum override ovr_max$_{1,i}$ is obtained from the viewpoint of the maximum acceleration.

Similarly, the maximum speed override ovr_max$_{2,i}$ is calculated from the viewpoint of the maximum speed. Assuming that the maximum speed for the first trial is $\omega_{v,i}$ and the maximum speed tolerance of the motor is $\omega_{p,i}$, the equation shown below is obtained.

$$\text{ovr\_max}_{2,i} = \frac{\omega_{p,i}}{\omega_{v,i}}$$

As described above, the maximum speed override ovr_max$_{2,i}$ is obtained from the viewpoint of the maximum speed. In addition to the two conditions described, the minimum speed override among the axes constitutes the maximum speed override usable for learning control. Thus, these conditions are collectively expressed as ovr_max. Then, the following formula is obtained.

$$\text{ovr\_max} = \max_i \{\text{ovr\_max}_{1,i}, \text{ovr\_max}_{2,i}\}$$

Assuming that the amount of the speed override increased in one step is $\Delta$, the number n of steps is calculated using $\Delta$ as shown below.

$$n = \text{ceiling}\left(\frac{\text{ovr\_max} - \text{ovr\_cur}}{\Delta}\right)$$

The learning is carried out by increasing the speed override to the maximum speed override in n steps, for example, and the learning correction amount is thus calculated. Specifically, in step S102, the learning control unit repeats the learning several times by increasing the speed override by a predetermined amount, and after the vibration is converged, calculates the learning correction amount in step S103.

Next, in step S104, the learning control unit determines whether the speed override has increased beyond the maximum speed override or not. In the case where the speed override is not greater than the maximum speed override, the learning control unit carries out the learning by increasing the speed override by a predetermined amount in step S102. In the case where the speed override has exceeded the maximum speed override, on the other hand, the learning control unit holds the learning correction amount in a F-ROM or a memory card (MC) in step S105.

In this way, the process for increasing the speed override and the process for carrying out the learning are repeated alternately until the speed override reaches the maximum speed override, thereby increasing the operation speed to a high level. During the actual operation, the learning correction amount is reproduced by accessing the F-ROM or the memory card (MC), as the case may be.

In the embodiments of this invention described above, the acceleration sensor is used as the sensor mounted on the robot mechanism unit. Nevertheless, a vision sensor, a gyro sensor, an inertia sensor or a distortion gauge may alternatively be used.

What is claimed is:

1. A robot comprising:
a robot mechanism unit having a sensor for detecting position of a control objective part to be controlled; and
a control unit for controlling the operation of the robot mechanism unit;
wherein the control unit includes:
a normal control unit for being provided position command for a target position or a target trajectory for the control objective part and controlling the operation of the robot mechanism unit using the provided position command and learning correction amount; and
a learning control unit for operating the robot mechanism unit according to a task program using the position command and the learning correction amount, calculating a target correction amount which is a difference between a position of the control objective part detected by the sensor and the target position, and carrying out learning to calculate a new learning correction amount based on the learning correction amount and the target correction amount in order that position of the control objective part approaches the target position; and
wherein the learning control unit calculates preliminarily a maximum speed override that can be set in the learning, repeats the learning to calculate the new learning correction amount using the learning correction amount in order to converge vibration at each speed override while increasing the speed override by predetermined increments a plurality of times until the maximum speed override is reached, and stores the new learning correction amount after convergence of vibration.

2. The robot according to claim 1,
wherein the learning control unit calculates the maximum speed override based on a maximum speed and a maximum acceleration allowed for the robot mechanism unit.

3. The robot according to claim 1,
wherein the learning control unit includes a high-pass filter for calculating position vibration component of the robot mechanism unit based on the data detected by the sensor.

4. The robot according to claim 1,
wherein the learning control unit calculates the position on each axis containing the position vibration component by inverse kinematics of the data detected by the sensor into the three basic axes.

5. The robot according to claim 1,
wherein the learning control unit causes the robot mechanism unit to perform a predetermined operation thereby to calculate the position and inclination of the sensor.

6. The robot according to claim 1,
wherein the learning control unit further includes a memory for holding the learning correction amount.

7. The robot according to claim 1,
wherein the sensor is one of a vision sensor, an acceleration sensor, a gyro sensor, an inertia sensor and a distortion gauge.

8. The robot according to claim 1,
wherein the sensor includes a mounting means replaceably mounted on the robot mechanism unit.

9. The robot according to claim 8,
wherein the sensor includes a magnet as the mounting means.

* * * * *